(No Model.)
M. & A. SATTLEY.
DRAFT EQUALIZER.
No. 525,667. Patented Sept. 4, 1894.
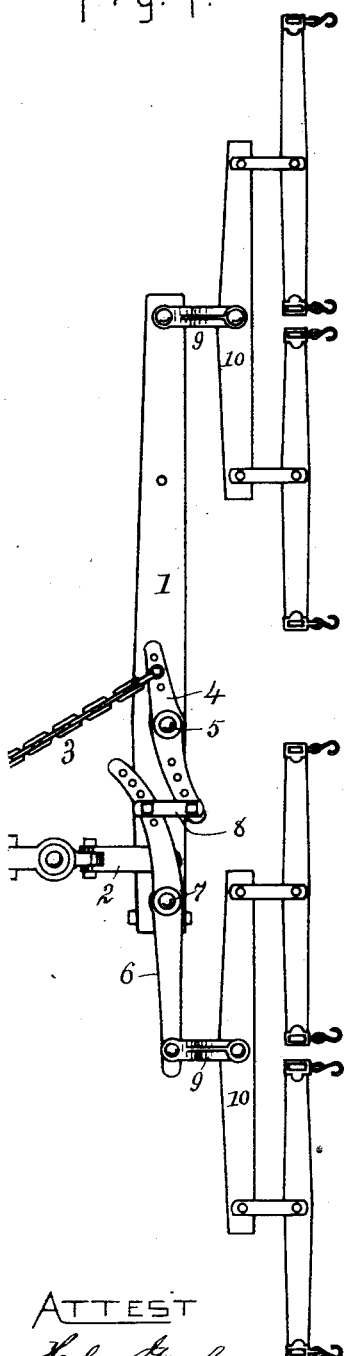
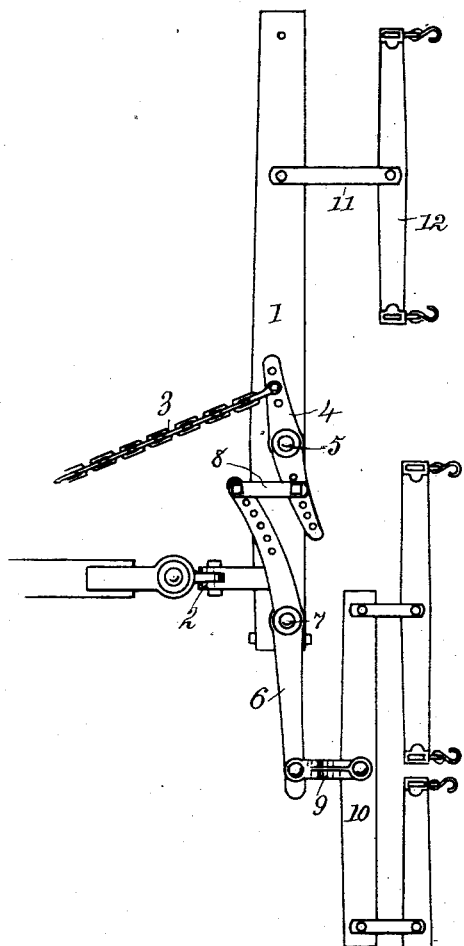
ATTEST
Helen Graham
William Graham
INVENTORS
M. and A. Sattley.
By L. P. Graham, Atty.

UNITED STATES PATENT OFFICE.

MARSHALL SATTLEY AND ARCHIBALD SATTLEY, OF SPRINGFIELD, ILLINOIS, ASSIGNORS TO THE SATTLEY MANUFACTURING COMPANY, OF SAME PLACE.

DRAFT-EQUALIZER.

SPECIFICATION forming part of Letters Patent No. 525,667, dated September 4, 1894.

Application filed June 23, 1894. Serial No. 515,471. (No model.)

*To all whom it may concern:*

Be it known that we, MARSHALL SATTLEY and ARCHIBALD SATTLEY, of Springfield, in the county of Sangamon and State of Illinois, have invented certain new and useful Improvements in Draft-Equalizers, of which the following is a specification.

This invention falls in the class generally termed equalizers, or eveners, but it might, with perhaps greater accuracy, be called a draft distributer, as it provides means whereby the stress of a load may be distributed in such manner that the weaker team, or horse, may be favored at the expense of the stronger;
and also provides for throwing the pull to one side or the other of the direct line whenever occasion requires such condition. In addition to this, however, it is an adjustable equalizer that may be used to equalize the draft among different numbers of draft animals while providing sufficient free swing to accommodate ordinary variations in speed of travel of different animals.

The invention is embodied in the structure hereinafter specified, and it is specifically defined in the appended claims.

In the drawings forming a part of this specification Figure 1 is a plan of the equalizer adjusted for use with a four horse team.
Fig. 2 is a similar view showing the device in condition to use three horses. Fig. 3 is a side view of a link used to connect a double tree with the equalizer bar.

The equalizer bar is shown at 1, at 2 is seen a direct draft hitch which connects an end of the bar with the load through the intervention of a universal joint. At 3 is shown a side draft chain which connects the load with one end of lever 4. The lever 4 is pivotally connected, at 5, with bar 1. Lever 6 is pivotally connected with the bar at 7, and the adjacent arms of the two levers are connected together by link 8. A double tree as 10, connects with the outer end of lever 6 by means of link 9, and another double tree may connect with the swinging end of bar 1 by means of a similar link, as seen in Fig. 1. The conjoining ends of the levers are each provided with a set of holes through which connections are made with the link, and when the equalizer is adjusted for the use of four horses the link connects with lever 4 at or near the end thereof, and with lever 6 between the end and the fulcrum. This condition is reversed when a single tree, as 12, in Fig. 2, is connected with the swinging end of the equalizer bar, through link 11, or otherwise, and the equalizer is thereby put in shape to use three horses. Adjustment between the extremes indicated will enable stress to be distributed as circumstances may require, and it is evident from a knowledge of the general principle of leverage that the stress may be shifted by changing the location of other connections, or by moving the fulcrums of one or both levers. The levers swing freely to permit one team, or horse, to walk slightly in advance of the others, and the links 9 are formed as shown to raise the double trees higher than the bar, and so neutralize the twisting strain that would otherwise be put onto the bar by the position of the levers.

It is essential to the invention that the levers be pivotally connected with the bar, that their adjacent arms shall be linked together, or otherwise connected in a manner to permit swinging motion, that the side draft hitch of the load shall connect with the inner arm of the inner lever, that one team hitch shall connect with the outer end of the outer lever, and that the other team hitch shall connect with the outer, or swinging end of the bar. It is also very desirable that provision be made for adjustment of the leverage, but the details of construction may be varied at will.

Having thus described the invention, we claim as new and desire to secure by Letters Patent—

1. A draft equalizer, or distributer, comprising a bar, two levers pivoted at different points on the bar and connected together at their adjacent ends, a side draft hitch connected with the inner arm of the inner lever, a team hitch connected with the outer arm of the outer lever, and another team hitch connected with the swinging end of the bar, substantially as set forth.

2. A draft equalizer, or distributer, comprising a bar having a direct draft hitch at or near one end, two levers pivoted at different points on the bar and connected together at their adjacent ends, a side draft hitch connected with the inner end of the inner lever, a team hitch connected with the outer end of the outer lever, and another team hitch connected with the swinging end of the bar, substantially as set forth.

3. A draft equalizer, or distributer, comprising a bar having a direct draft hitch at or near one end, two levers pivoted at different points on the bar and connected together at their adjacent ends in a manner permitting variation of the leverage, a side draft hitch connected with the inner arm of the inner lever, a team hitch connected with the outer end of the outer lever, and another team hitch connected with the swinging end of the bar, substantially as set forth.

In testimony whereof we sign our names in the presence of two subscribing witnesses.

MARSHALL SATTLEY.
ARCHIBALD SATTLEY.

Witnesses:
J. H. MATHENY,
MARY A. CHRISTY.